United States Patent
Lechuga Gomez et al.

(10) Patent No.: US 7,646,494 B2
(45) Date of Patent: Jan. 12, 2010

(54) SYSTEM AND METHOD FOR DETECTING THE DISPLACEMENT OF A PLURALITY OF MICRO- AND NANOMECHANICAL ELEMENTS, SUCH AS MICRO-CANTILEVERS

(75) Inventors: Laura M. Lechuga Gomez, Madrid Tres Cantos (ES); Mar Alvarez Sanchez, Victoria (AU); Francisco Javier Tamayo de Miguel, Madrid Tres Cantos (ES)

(73) Assignee: Consejo Superior de Investigaciones Cientificas, Madrid (ES)

( * ) Notice: Subject to any disclaimer, the term of this patent is extended or adjusted under 35 U.S.C. 154(b) by 25 days.

(21) Appl. No.: 11/962,027

(22) Filed: Dec. 20, 2007

(65) Prior Publication Data

US 2008/0259356 A1  Oct. 23, 2008

Related U.S. Application Data

(63) Continuation of application No. 10/592,041, filed as application No. PCT/EP2005/002356 on Mar. 4, 2005, now abandoned.

(30) Foreign Application Priority Data

Mar. 8, 2004 (EP) .................................. 04381004

(51) Int. Cl.
    *G01B 11/14* (2006.01)
    *G01J 5/02* (2006.01)

(52) U.S. Cl. ...................... 356/622; 356/607; 356/608; 356/614; 250/338.1; 250/234

(58) Field of Classification Search ......... 356/607–608, 356/614–615, 622; 250/234, 201.3, 216, 250/338.1, 336.1, 306–307, 492.2; 73/105, 73/579, 649, 651

See application file for complete search history.

(56) References Cited

U.S. PATENT DOCUMENTS

| | | | | | |
|---|---|---|---|---|---|
| 5,253,515 A | * | 10/1993 | Toda et al. | ..................... | 73/105 |
| 5,723,775 A | * | 3/1998 | Watanabe et al. | ............. | 73/105 |
| 5,929,440 A | * | 7/1999 | Fisher | ..................... | 250/338.1 |
| 6,008,489 A | * | 12/1999 | Elings et al. | ................ | 250/234 |
| 6,138,503 A | * | 10/2000 | Ray | ............................ | 73/105 |
| 6,708,556 B1 | * | 3/2004 | Kim et al. | ..................... | 73/105 |
| 7,045,780 B2 | * | 5/2006 | Kley | .......................... | 250/306 |

FOREIGN PATENT DOCUMENTS

JP    2000056211 A  *  2/2000

* cited by examiner

*Primary Examiner*—Sang Nguyen
(74) *Attorney, Agent, or Firm*—Knobbe, Martens, Olson & Bear, LLP

(57) ABSTRACT

The invention relates to a system and method for detecting the displacement, such as the deflection, of a plurality of elements (1), such as microcantilevers, forming part of an array (2), by emitting a light beam (4) towards the array (2) and by receiving a reflected light beam on an optical position detector, whereby the position of incidence of the light beam is determined by the displacement of the corresponding element. The system further comprises: scanning means (7) for the displacing the light beam (4) along the array (2) so that the light beam is sequentially reflected, by the individual elements (1) along said array (2); and reflection detecting means (11) for detecting when the light beam is reflected by an element. The system is arranged so that when the reflection detecting means (11) detect that the light beam is reflected by an element, the corresponding position of incidence of the light on the detector is taken as an indication of the displacement of the element.

14 Claims, 3 Drawing Sheets

SYSTEM AND METHOD FOR DETECTING THE DISPLACEMENT OF A PLURALITY OF MICRO- AND NANOMECHANICAL ELEMENTS, SUCH AS MICRO-CANTILEVERS

RELATED APPLICATION

This application is a continuation of Application Ser. No. 10/592,041, filed Sep. 8, 2006 now abandoned, which is the U.S. National Phase application under 35 U.S.C. §371 of International Application PCT/EP2005/002356 filed Mar. 4, 2005, which claims the benefit of European Patent Application No.: 04381004.3, filed Mar. 8, 2004.

TECHNICAL FIELD

The invention relates to a system and a method for the detection of the displacement of mechanical elements, suitable for use in, for example, measurement systems based on microcantilevers, where measurements are carried out by detecting the displacement (such as the deflection) and/or movement of said cantilevers.

STATE OF THE ART

There is an increasing interest in systems based on micro- and nanomechanical elements, for communication, small force detection and ultrasensitive bio-chemical sensors (H. G. Craighead, *Science* 290, 1532 (2000)). For example, microcantilevers are used for sensitive mapping of attractive and repulsive forces at nanometer scale in atomic force microscopy (Y. Martin, C. C. Williams and H. K. Wickramasinghe, *J. Appl. Phys.* 61, 4723 (1987)), for ultrasensitive nanomechanical biological and chemical sensors (B. Ilic, D. Czaplewski, H. G. Carighead, P. Neuzil, C. Campagnolo and C. Batt, *Appl. Phys. Lett.* 77, 450 (2000)), for charged-particle detection (A. C. Stephan, T. Gaulden, A. D. Brown, M. Smith, L. F. Miller and T. Thundat, *Rev. Sci. Instrum.* 73, 36 (2002)), for writing and readout of ultrahigh density data storage (P. Vettiger et al, *Microelectronics Engineering* 46, 11 (1999)) and in detectors of gravitational waves (C. Caves, K. Thorne, R. Drever, V. Sandberg and M. Zimmermann, *Rev. Mod. Phys.* 52, 341 (1980)).

Normally, the systems are based on cantilevers having a fixed and a movable end; in these systems, it is normally the displacement and/or movement of the "free" end that is detected. However, there are also systems based on cantilevers clamped at both ends; then, the movement of the central part can be detected. Further, there are other micro- and nanomechanical structures that are movable and flexible, such as doubly clamped paddles whose "easy" direction of motion corresponds to the torsion of the paddle around the axis of the hinges that connect the paddle to a frame (basically, like a square racket fastened to a frame by two opposite handles of the racket, extending along an axis). Other known systems use membranes that are connected to a frame through two sets of hinges, which allows two angular degrees of freedom. Hereinafter, when discussing the general background of the invention, we will refer to the micro- or nano-cantilevers having one fixed (clamped) and one free end, the deflection of which is to be measured (here deflection is the displacement of the microcantilever free end). However, the invention can also be applied, in a similar manner, to other mechanical elements, such as those mentioned above.

In a microcantilever system, this deflection is of about several nanometers and a resolution better than 0.1-1 nm may be needed, depending on the application. For the readout of the cantilever deflection, there are several techniques, such as capacitive detection, detection based on tunnel current, optical interferometry, piezoresistive readout, as well as the so-called optical beam deflection technique.

Examples of microcantilever systems are disclosed in, for example:

Engel et al, *Trends in Cell Biology*, Volume 9, February 1999, pp. 77-80, "Atomic force microscopy: a powerful tool to observe biomolecules at work"

P. Vettiger et al, *IBM J. Res. Develop.*, Volume 44, Number 3, May 2000, pp. 323-339. "The millipede-more than one thousand tips for future AFM storage"

WO-A-01/33226

WO-A-03/091458

The optical beam deflection method is the most sensitive one, and it has the advantage that it can be easily implemented. FIG. 1 schematically illustrates a conventional prior art arrangement for optical beam deflection. A light source 3 (normally a laser light source) produces a light beam 4 (normally a laser light beam, in the visible, ultraviolet or infrared spectrum) that is focused (that is, either directly focused or via directing means involving, for example, one or more mirrors 9, etc.) onto the element 1, the displacement of which is to be measured, for example, onto the end of a micro- or nanomechanical cantilever. The deflection of the beam reflected off the cantilever is measured with a photodetector 5, for example, a segmented photodetector, a continuous position sensing photodetector, a photodetector array etc. Commonly a segmented photodetector is employed that is split into two segments oriented parallel to the cantilever motion axis. The cantilever deflection produces a displacement of the reflected laser spot on the photodetector. Thus the difference in photocurrents between the two segments is proportional to the cantilever deflection.

This system is suitable for measuring both the static and the dynamic behaviour of the elements/cantilevers, for example, the maximum deflection, mean value of deflection, amplitude at a reference frequency (the element can be externally driven by a excitation force oscillating at the reference frequency), phase of the motion with respect to a external driving signal, frequency, etc. The measured static displacement, amplitude, frequency, etc., can then be related with an object that is to be measured and that interacts with the cantilever, and with signals used to stimulate the object and/or the cantilever.

Now, the technique described above is practical when the displacement/movement of individual elements/cantilevers is to be measured. However, many practical uses of micro- and nanomechanical element measurement systems requires of the use of microarrays comprising a plurality of cantilevers arranged in an array and operating in parallel, thus providing for higher speed and multifunctionality. Although the optical beam deflection technique as outlined above can resolve deflections so small as 0.1 nm, implementation of this technique for readout in microcantilever arrays has proved to be a complex issue. So far, arrays of light sources have been used, said sources having the same pitch as the cantilever array. The light sources are switched on and off individually, for individual illumination of each cantilever of the array, and for sequential readout of the deflection of each cantilever by a continuous position sensing detector (also called position sensitive detector). This kind of systems is disclosed in, for example:

H. P. Lang, et al., *Applied Physics Letters*, Volume 72, Number 3, 19 Jan. 1998, pp. 383-385, "Sequential Position Readout from Arrays of Micromechanical Cantilever Sensors"

However, this requires the use of sophisticated technology and precise alignment of the light beams, the microcantilevers and the photodetectors. Moreover, one light beam array will only be suitable for microcantilever arrays having the same pitch (distance between subsequent cantilevers).

DESCRIPTION OF THE INVENTION

One aspect of the invention relates to a system for detecting the deflection, deviation or displacement, and its time variation, of a plurality of elements (such as micro- or nanomechanical elements, for example, micro- or nanomechanical cantilevers clamped at one or both ends, elastic membranes, etc.) (or, at least, of parts of said elements, such as the displacement of an end of a cantilever due to the deflection thereof forming part of an array, said system comprising:

a light source (for example, a laser light source for emitting visible, ultraviolet or infrared light) arranged to emit a light beam towards the array (in order that said light beam be reflected upon incidence of the light beam on at least one element of said array —for example, on the end of a cantilever element—, in order that said light beam be reflected by said element in a direction or manner determined by the deflection or displacement of said element or of the relevant part of the element); and an optical position detector (basically, any kind of detector suitable for non-contact position sensing using optical sensors, such as a continuous position sensing detector or a segmented position sensing detector—such as a quadrant position sensing detector—; for example, a photodector arrangement can be used that comprises an array of photodectors each having a size of the same order or smaller than the cross section of the laser beam; a large number of suitable devices are commercially available) arranged to receive the light beam upon reflection of said light beam by said array, said position detector being arranged to provide a first output indicative of a position of incidence of the reflected light beam on said position detector, whereby said position of incidence is determined by or related to the displacement of the corresponding element (or part of the element).

According to the invention, the system further comprises:

scanning means for displacing the light beam along the array so that the light beam is sequentially reflected by the individual elements along said array (by one element at a time or by a group comprising several elements), towards the position detector; and reflection detecting means for detecting when the light beam is reflected by an element (or when there is a "maximum" reflection by one element and the adjacent elements).

The system is arranged so that when the reflection detecting means detect that the light beam is reflected by an element (or by a part of the element), the corresponding first output is taken as an indication of the deflection or displacement of said (part of said) element (that is, the position of incidence of the light beam on the position detector, for example, along a certain axis, is taken as a value representing the displacement of the element).

In this manner, one single laser light source can be used for sequentially measuring the displacement of all of the elements of the array, and it can be used for arrays having different pitches, without using complex alignment methods and devices. During displacement, the light beam is sequentially reflected by one or more of the elements; if the diameter of the beam is smaller than the distance between the elements, it will be easy to associate the different elements with the output from the position detector (there will be clear "interruptions" in the output from the position detector, as there will be no reflected light beam towards said detector when the light beam is directed to a space between two elements). However, the diameter of the light beam can be larger than the separation between the elements, and several elements may be illuminated at the same time. In this case, the individual deflection or displacement of each element/cantilever can be deduced using arrays of photodetectors as the position detector; from the reflection pattern, the individual displacements can be deduced.

The reflection detecting means can comprise:

means for detecting an intensity of light received by said position detector; and means for detecting variations (for example, peaks) in said intensity;

whereby the system can be arranged to interpret said variations so as to determine when said intensity corresponds to a reflection of the light beam by an element.

If the means for detecting variations in said intensity are arranged for detecting peaks in said intensity, the system can being arranged to interpret detection of a peak of said intensity as a detection of reflection of the light beam by an element (this is maybe the most practical approach, as a peak in the intensity will normally be obtained when a maximum portion of the laser beam is reflected by the element).

The system can further comprise data processing means for associating the first outputs with specific elements along the array, in accordance with the variations detected in said intensity. That is, for example, during a scanning movement of the beam along the array, the first detected peak can be considered to correspond to reflection on the first element of the array, and the first output signal will then correspond to the deflection or displacement of said element (or part of said element).

In what regards the scanning means, they may comprise:

means for carrying out a first continuous scan (or a first series of continuous scans) of the array by continuously displacing the light beam along said array, by moving at least one scan element (such as a mirror or the laser light source itself) from a first to a second position in order that the light beam, during movement of said scan element from said first to said second position, be sequentially reflected by the individual elements along said array;

means for recording selected positions of said scan element during said first scanning, said selected positions corresponding to positions in which reflections are detected by the reflection detecting means (for examples, by detection of peaks in the intensity of light registered by the detector); and means for carrying out subsequent scans of the microcantilever array by displacing the scan element stepwise from one selected position to a subsequent selected position. Of course, the expression "stepwise" should be interpreted broadly and it should not be interpreted to mean that the scan element has to "jump" "directly" from one selected position to a subsequent selected position; basically, instead of jumping "directly" from one selected position to the next selected position, it can move continuously or almost continuously, but with a higher velocity when it is far away from a selected position and with a lower velocity when it is close to and/or in the selected position; the important issue is that the scan element should "spend proportionally more time" in and/or around the selected positions, than between the selected positions. For a practical implementation, one will choose an approach giving reasonably good results and efficient use of scanning time, while not requiring excessively sophisticated and/or expensive arrangements for displacing the scan element. That is, for example, the scan element can move rapidly over positions in which there is no reflection, and slowly over positions where there is a reflection of the light beam by an element of the array (for example, when the detected intensity is above a certain threshold).

That is, the first or a plurality of first continuous scans are used for determining which positions of the scan element are the ones that give rise to (maximal) reflection of the light beam by the element. This information is recorded and used during subsequent scans, so that said subsequent scans can be made stepwise, thus saving time (the laser beam "spends less time" at positions in which there is no reflection) and allowing more averaged information to be obtained in positions where the elements of the array are illuminated.

The position detector can be, for example, a photodetector array or a continuous position sensing detector (also called position sensitive detector).

The light source can be arranged to provide a light beam having a diameter smaller than a distance between subsequent elements of the array.

Another aspect of the invention relates to a method for detecting the deflection, deviation or displacement of a plurality of elements (or, at least, of parts of said elements) forming part of an array, especially for detecting the deflection or displacement of a plurality of micro- or nanomechanical elements forming part of such array. The method comprises the steps of:

directing a light beam towards the array;

receiving, using an optical position detector, the light beam upon reflection of said light beam by said array, and providing a first output from said position detector, said first output being indicative of a position of incidence of the reflected light beam on said position detector, whereby said position of incidence is determined by the deflection or displacement of the corresponding element.

According to the invention, the method further comprises the steps of:

displacing or scanning the light beam along the array so that the light beam is sequentially reflected, by the individual elements along said array, towards the position detector;

detecting when the light beam is reflected by an element; and when detecting that the light beam is reflected by an element, taking the corresponding first output as an indication of the deflection or displacement of said element.

The step of detecting when the light beam is reflected by an element can comprise the steps of:

detecting an intensity of light received by said position detector;

detecting variations in said intensity;

interpreting said variations so as to determine when said intensity corresponds to a reflection of the light beam by an element.

If so, the step of detecting variations in said intensity can comprise the step of detecting peaks in said intensity; and the step of interpreting said variations can comprise the step of determining, upon detection of a peak of said intensity, that said peak corresponds to a reflection of the light beam by an element.

The method can further comprise the step of associating, using data processing means, the first outputs with specific elements along the array, in accordance with the variations detected in the intensity of the light beam received by the position detector.

On the other hand, the step of scanning the light beam can comprise the steps of:

carrying out a first continuous scan of the array by continuously displacing the light beam along said array, by moving at least one scan element from a first to a second position in order that the light beam, during movement of said scan element from said first to said second position, be sequentially reflected by the individual elements along said array;

recording selected positions of said scan element during said first scanning, said selected positions corresponding to positions in which reflections of the light beam, by the respective elements, are detected;

carrying out subsequent scans of the array by displacing the scan element stepwise from one selected position to a subsequent selected position. (The term "stepwise" should be interpreted in a broad sense, as outlined above).

DESCRIPTION OF A PREFERRED
EMBODIMENT OF THE INVENTION

Figure 1:
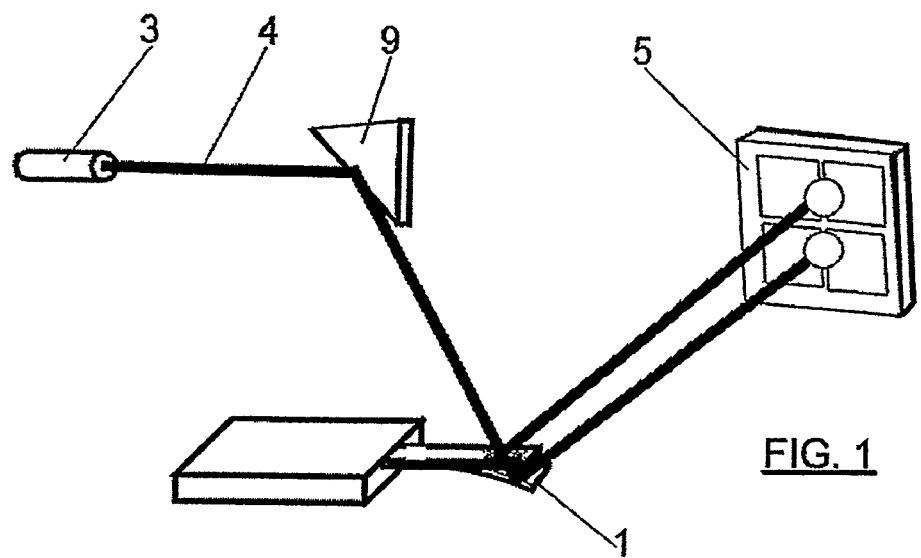
FIG. 1 schematically illustrates a prior art arrangement for measuring displacement of the end of a microcantilever, using the optical beam deflection technique.
Figure 2:
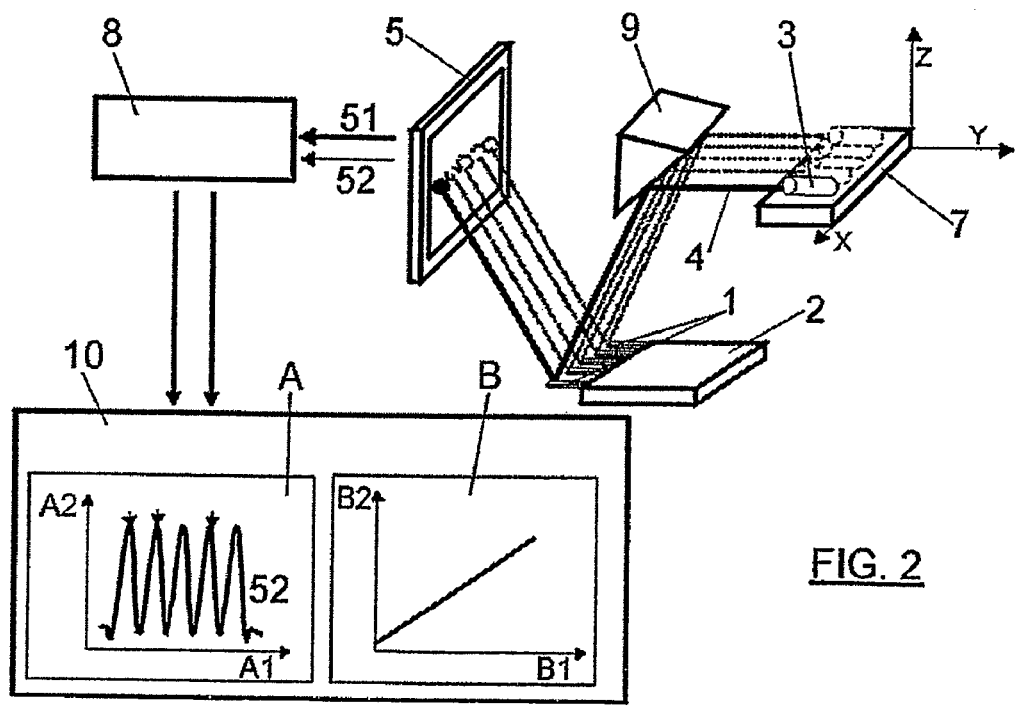
FIG. 2 schematically illustrates an arrangement according to a preferred embodiment of the invention (some of the elements can be substantially identical to elements used in the prior art arrangement of FIG. 1, and for these the same reference numerals are used).

FIG. 2 shows an arrangement suitable for detection of the individual deflection of a plurality of micro- (or nano-) cantilevers 1, arranged to form an array 2 of such microcantilevers. As in the prior art arrangement, for measuring the deflection, a light beam 4 is generated by a laser light source 3 and projected (when necessary, using conventional projection means such as one or more mirrors 9, lenses, etc.), onto the array 2, in order to be reflected, by one or more of the microcantilevers 1, onto a sensitive surface of an optical position detector 5, that is, onto a detector, such as a photodetector array, a continuous position sensing detector, CCD, or similar, which is arranged to provide a first output 51 signal indicative of a position of incidence of the reflected light beam on said position detector, whereby said position of incidence is determined by the deflection of the microcantilever 1. In this case, with the arrangement as illustrated in FIG. 2 and as the microcantilever is arranged to oscillate in the direction of the z-axis of the co-ordinate system illustrated in FIG. 2, the first output depends on where the reflected light beam hits the sensitive surface of the position detector, along the z-axis. Thus, the position detector may comprise an array or matrix of photodetectors arranged so as to provide a first output signal 51 proportional to the position, along the z-axis, of incidence of the light beam.

On the other hand, the system comprises scanning means 7 (only schematically illustrated in FIG. 2), for example, including a mirror arranged to pivot in a controlled manner around an axis (for example, an axis in the z-direction of FIG. 2), a mirror arrangement including a mirror device linearly displaceable along the x-axis, or means for displacing the laser light source 3 itself along the x-axis, whereby said scanning means can be implemented using microelectromechanical elements (the design of a suitable scanning means is a task that can easily be performed by the skilled person, who will choose a suitable system using the most appropriate design in view of the specific application, for example, in view of the requirements as to cost and performance). In any case, the scanning means 7 are arranged for displacing the light beam 4 along the array 2 (in FIG. 2, moving in the direction of the x-axis) so that the light beam is sequentially reflected, by the individual elements 1 along said array 2, towards the position detector 5, as illustrated in FIG. 2.

The position detector receives the light beam and, in addition to the first output 51 (indicative of the position of incidence along the z-axis), it also provide a second output 52, consisting in a signal having a value that is a function of the intensity of the light received by the position detector (for example, proportional to said intensity). Both the first output 51 and the second output 52 are sampled using a analogue/digital card 8 providing digital signals corresponding to the first 51 and second 52 outputs; said digital signals are forwarded to an electronic data processing system 10, shown in more detail in FIG. 3. Now, as shown in FIG. 2, the data processing system 10 is provided with information corresponding to the second output 52; this signal is schematically illustrated in FIG. 2, showing a diagram A having a first axis A1 corresponding to the time of a period of scanning, and a second axis A2 corresponding to the value of the intensity of the light measured by the position detector (that is, to the second output 52). As illustrated in diagram A of FIG. 2, the intensity varies in time; the peaks correspond (at least, approximately. as discussed below) to the moments when the light beam is centred onto one of the cantilevers 1, that is, to the moments when a maximum of light is reflected towards the position detector 5. On the other hand, diagram B has a time axis B1 and a second axis B2 corresponding to the position of the light beam along the x-axis during scan (this information can be achieved by an input signal from the scanning means 7, indicative of the position of a scan element such as a mirror for deviating the light beam, or similar).

Thus, comparing diagrams A and B is can be observed how, during scanning of the light beam along the x-axis, there are a number of peaks in the intensity of the light received by the position detector 5. The system is arranged so that when a peak is detected, the value of the corresponding first output 51 signal (which, for example, corresponds to the point of incidence of the reflected light beam on the position detector, along the z-axis) is taken as an indication of the deflection of said element.

In practice, there are several methods for associating a peak with a value of deflection to be measured by reading the position of the incidence of the light-beam on the position detector; for example, we have the so-called maxima, fixed and average methods.

In the so-called maxima method, the deflection is measured (the first output is read and taken as an indication of the deflection) for the laser source position at which the intensity of the light detected by the position detector is at the maximum of the peak.

In the so-called fixed method, a fixed laser source position is specified corresponding to the intensity peak, and the deflection of the microcantilever by read-out from the position detector is made at said fixed laser source position (which not necessarily corresponds to the maximum of the intensity of the light received by the detector). This method is useful in the case of there being several peaks from a single microcantilever, for example, due to interference processes. For instance, depending on the laser beam size, two intensity peaks can be obtained corresponding to the edges of the microcantilever, and a small valley between them corresponding to the centre. Thus, it can be that the maximum intensity does not correspond to a moment when the light is hitting the "centre" of the cantilever; the fixed method can thus be useful for making sure that the read-out of the position correspond to the moment when the light hits (approximately) the centre of the cantilever.

The so-called average method can also avoid the problems of multiple peaks and enhances the signal-to-noise ratio. This method performs an average of the deflection signal over all the intensity values higher than the defined threshold, corresponding to the selected width of each peak. In other words, the intensity values, corresponding to the laser source positions along the "width" of the peak, are used as a weight function, in order to average the microcantilever deflection.

Figure 3:
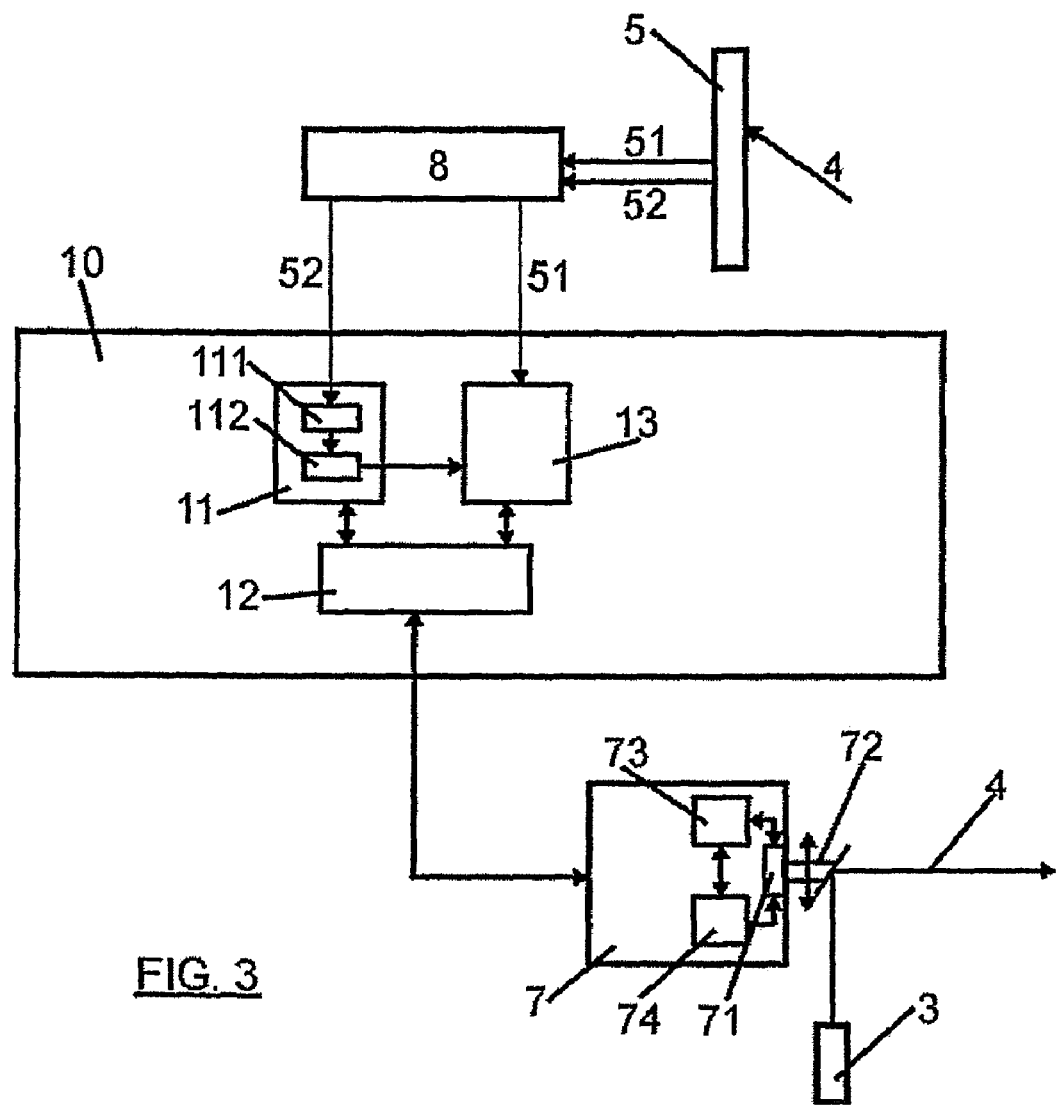
FIG. 3 schematically illustrates relevant functional modules of the arrangement illustrated in FIG. 3.

The process is schematically illustrated in FIG. 3, showing how the position detector is providing the first and second outputs to the electronic data processing system 10 comprising reflection detecting means 11. The second output is received at a module 111 of said reflection detecting means 11, said module 111 being arranged for detecting the intensity of light received by said position detector (this intensity can correspond to the level of the second output 52 signal). Electronic data processing means 112 are provided for detecting variations in said intensity, especially for detecting the peaks. The system is arranged to interpret said peaks as a detection of reflection of the light beam by an element. Thus, when module 112 detects a peak, it triggers a sampling module 13 which takes the current value of the first output 51 signal as a value of the deviation of the cantilever 1 at this specific moment.

A further data processing means 12 is arranged, inter alia for associating the subsequent samples of the first outputs with specific cantilevers 1 along the array, in accordance with the variations detected in said intensity and in co-ordination with the scanning means.

As all the relevant signals can be fed to the electronic data processing system 10, sophisticated algorithms can be used for signal interpretation and for scanning.

FIG. 3 also schematically illustrates the scanning means 7 comprising means 71 for carrying out a first continuous scanning of the array by continuously displacing the light beam 4 along said array, by moving at least one scan element 72 (such as a pivoting or linearly displaceable mirror or the laser light source itself) from a first to a second position in order that the light beam, during movement of said scan element 72 from said first to said second position, be sequentially reflected by the individual elements 1 along said array 2. The scanning means further comprise means 73 for recording selected positions of said scan element (each position corresponding to a specific point of the B2-axis of diagram 2 of FIG. 2) during said first scanning, said selected positions corresponding to positions in which reflections are detected by the reflection detecting means (for example, to peaks in the intensity, as explained above). Finally, there are provided means 74 for carrying out subsequent scans of the microcantilever array by displacing the scan element 72 stepwise from one selected position to a subsequent selected position, in accordance with the recorded data.

The invention has proved to be practical to use for measuring the individual deflection of microcantilevers of a microcantilever array. The following is an example of how the invention has been put into practice for measuring deflections of a microcantilever array composed of three silicon microcantilevers, separated from each other by a distance of 250 µm. The cantilevers were each 200 µm long, 50 µm wide, and 1 µm thick. In this particular application, the deflection of the microcantilevers was related to the local temperature, based on the principle of the bimetallic effect: the top side of each microcantilever was coated with a 20 nm thick gold layer, whereby temperature variations near the microcantilevers produced their bending due to the different expansion coefficients of the gold layer and the silicon. For instance, an increase of the local temperature produces a higher expansion of the gold with respect to the silicon, producing a downwards deflection of the microcantilevers, conversely a temperature decrease produces an upwards deflection. To test this principle, a Peltier cell located close to the array was employed for heating and cooling of the microcantilevers. The temperature was measured via a thermistor near the array and a temperature controller was included for external control of the temperature.

The detection of the microcantilever bending was carried out with the optical beam deflection method outlined above, in which the laser beam from a laser diode was focused at the end of the microcantilever by using a lens; the laser beam reflected off the microcantilevers was collected into a position detector. The scanning of the incident laser beam onto the array was performed by displacing the laser diode source with a voice-coil-based system (namely, the V-106.2S voice-coil scanning system commercialized by Physik Instrumente (PI) GmbH & Co. KG). Of course, other scanning systems based on motorised micro-positioning stages and piezoelectric systems could also used.

The scanning system displaced the incident laser beam along the array of microcantilevers. The experimental set-up was similar to that of FIG. 2. The signals from the position-sensing photodetector were connected to the analogue/digital card for processing by software and visualisation in real-time with a PC. Similarly, the scanning was controlled by software.

The data acquisition system was continuously measuring the output signals from the position detector (namely, intensity of the light and the position of incidence), as well as the associated position of the scanning laser source.

Firstly, an initial quick (in the order of mm/s) x-scan of the laser source was performed, covering the entire width of the array. As already explained above, when the laser beam hits a microcantilever of the array, a significant increase of the light intensity is detected in the photodetector. Thus, after the first quick scan, the light intensity as a function of the laser source position was obtained. Intensity peaks were obtained for laser source positions at which the laser beam hit the ends of the microcantilevers. Following scans were performed more slowly at the laser source positions where reflection above the thresholds was detected (this improves the signal-to-noise ration and it optimises the time for laser travelling). The deflection of the corresponding microcantilever was measured by reading the signal of the z-position of the reflected laser beam onto the position detector, when the laser was hitting the microcantilever surface.

This was determined arbitrarily by defining a threshold value of the intensity. Intensities higher than the threshold were considered to imply that the laser was hitting the microcantilever, at least partly. Thus each intensity peak above the threshold was considered to correspond to a laser source position where the laser beam hit a microcantilever (hence, higher intensity threshold would mean narrower intensity peaks).

The deflection of each microcantilever could be determined using any of the three methods (that is, the maxima, fixed and average methods) outlined above (in the example given, the average method was used).

Figure 4:
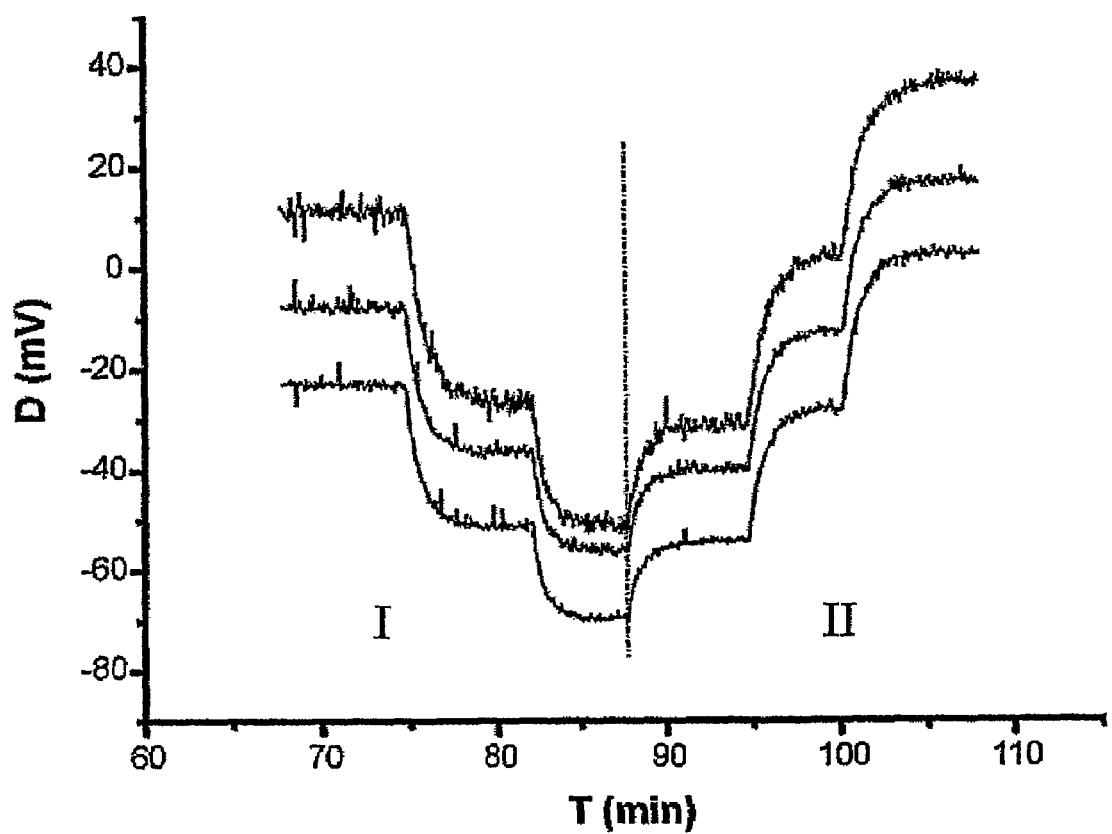
FIG. 4 is a graph showing measurements on cantilever bending due to temperature changes, carried out using an embodiment of the invention.

FIG. 4 is a graph showing the bending of three cantilevers (silicon+gold) due to the heating of the array (downward deflection, corresponding to period I of the graph) and the following cooling (upward deflection, corresponding to period II of the graph). Each curve corresponds to one of the cantilevers.

Throughout the description and claims of the specification, the word "comprise" and variations of the word, such as "comprising", is not intended to exclude other additives, components, integers or steps.

The invention claimed is:

1. A system for detecting the displacement, of a plurality of elements forming part of an array, said system comprising: a light source arranged to emit a light beam towards the array; an optical position detector arranged to receive the light beam upon reflection of said light beam by said array, said position detector being arranged to provide a first output indicative of a position of incidence of the reflected light beam on said position detector, whereby said position of incidence is determined by the displacement of the corresponding element, scanning means for displacing the light beam along the array so that the light beam is sequentially reflected, by the individual elements along said array, towards the position detector; and reflection detecting means for detecting when the light beam is reflected by an element; the system being arranged so that when the reflection detecting means detect that the light beam is reflected by an element, the corresponding first output is taken as an indication of the displacement of said element, wherein the scanning means comprise: means for carrying out a first continuous scan of the array by continuously displacing the light beam along said array, by moving at least one scan element from a first to a second position in order that the light beam, during movement of said scan element from said first to said second position, be sequentially reflected by the individual elements along said array; means for recording selected positions of said scan element during said first scan, said selected positions corresponding to positions in which reflections are detected by the reflection detecting means; means for carrying out subsequent scans of the array by displacing the scan element stepwise from one selected position to a subsequent selected position.

2. A system according to claim 1, wherein the reflection detecting means comprise: means for detecting an intensity of light received by said position detector; and means for detecting variations in said intensity; the system being arranged to interpret said variations so as to determine when said intensity corresponds to a reflection of the light beam by an element.

3. A system according to claim 2, wherein said means for detecting variations in said intensity are arranged for detecting peaks in said intensity; the system being arranged to interpret detection of a peak of said intensity as a detection of reflection of the light beam by an element.

4. A system according to claim 2, further comprising data processing means for associating the first outputs with specific elements along the array, in accordance with the variations detected in said intensity.

5. System according to claim 1, wherein the position detector is a photodetector array.

6. System according to claim 1, wherein the position detector is a continuous position sensing detector.

7. System according to claim 1, wherein the light source is a laser light source.

8. System according to claim 1, wherein the light source is arranged to provide a light beam having a diameter smaller than a distance between subsequent elements of the array.

9. System according to claim 1, wherein the elements are micro- or nanomechanical elements.

10. System according to claim 9, wherein the elements are cantilevers.

11. A method for detecting the displacement, of a plurality of elements forming part of an array, especially for detecting the displacement of a plurality of micro-or nano-mechanical elements forming part of such array, said method comprising the steps of: directing a light beam towards the array; receiving, using an optical position detector, the light beam upon reflection of said light beam by said array, and providing a first output from said position detector, said first output being indicative of a position of incidence of the reflected light beam on said position detector, whereby said position of incidence is determined by the displacement of the corresponding element, scanning the light beam along the array so that the light beam is sequentially reflected, by the individual elements along said array, towards the position detector; detecting when the light beam is reflected by an element; when detecting that the light beam is reflected by an element, taking the corresponding first output as an indication of the displacement of said element, wherein the step of scanning the light beam comprise the steps of carrying out a first continuous scan of the array by continuously displacing the light beam along said array, by moving at least one scan element from a first to a second position in order that the light beam, during movement of said scan element from said first to said second position, be sequentially reflected by the individual elements along said array; recording selected positions of said scan element during said first scan, said selected positions corresponding to positions in which reflections of the light beam, by the element, are detected; carrying out subsequent scans of the array by displacing the scan element stepwise from one selected position to a subsequent selected position.

12. A method according to claim 11, wherein step of detecting when the light beam is reflected by an element comprises the steps of: detecting an intensity of light received by said position detector; detecting variations in said intensity; interpreting said variations so as to determine when said intensity corresponds to a reflection of the light beam by an element.

13. A method according to claim 12, wherein the step of detecting variations in said intensity comprises the step of detecting peaks in said intensity; and the step of interpreting said variations comprises the step determining, upon detection of a peak of said intensity, that said peak corresponds to a reflection of the light beam by an element.

14. A method according to claim 12, further comprising the step of associating, using data processing means, the first outputs with specific elements along the array, in accordance with the variations detected in the intensity of the light beam received by the position detector.

\* \* \* \* \*